J. J. McGOWAN.
FEEDER FOR PICKING MACHINES.
APPLICATION FILED JAN. 18, 1911.

1,091,438.

Patented Mar. 24, 1914.

Witnesses
E. J. Ogden
Frederic A. Greene

Inventor
James J. McGowan

By
Howard E. Barlow
Attorney

UNITED STATES PATENT OFFICE.

JAMES J. McGOWAN, OF PAWTUCKET, RHODE ISLAND.

FEEDER FOR PICKING-MACHINES.

1,091,438.

Specification of Letters Patent. Patented Mar. 24, 1914.

Application filed January 18, 1911. Serial No. 603,252.

*To all whom it may concern:*

Be it known that I, JAMES J. McGOWAN, a citizen of the United States, and resident of Pawtucket, in the county of Providence and State of Rhode Island, have invented certain new and useful Improvements in Feeders for Picking-Machines, of which the following is a specification.

This invention relates to machines for operating upon fibrous material, such as cotton, to prepare it for the lappers, and has particular reference to the cylinder having pins to coöperate with the lifting pin apron of the feeder.

For different lengths of fiber, it is desirable that the pin cylinder shall be set to operate at different distances from the toothed or pin apron which lifts the material from the mass in the feeder. While it may be desirable to operate the pin cylinder at a given distance from the apron for short staple cotton, it is found best to increase the distance for long staple cotton.

The object of the present invention is to provide means for readily and accurately shifting and securing the pin cylinder to and in such position as best suited for the quality of the fibrous material being treated.

With these and other objects in view, the invention consists of certain novel features of construction, as will be more fully described and particularly pointed out in the appended claims.

Figure 1:
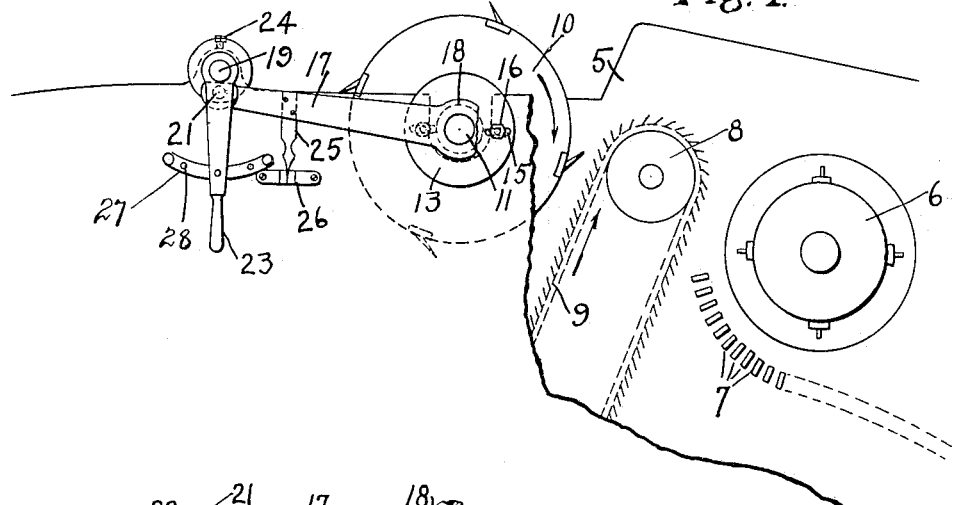
Figure 2:
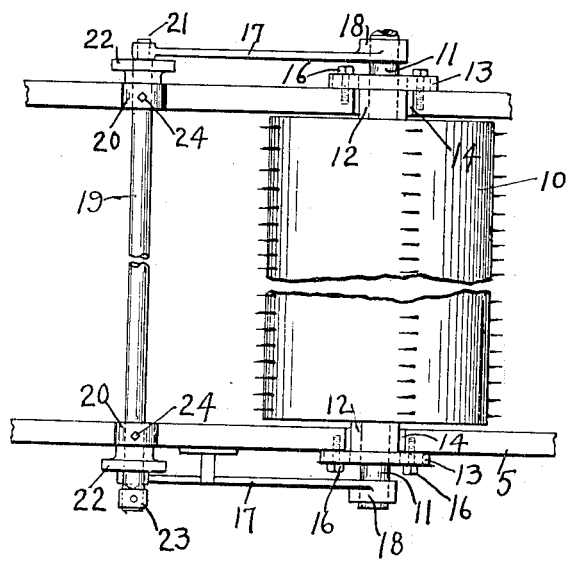
Figure 3:
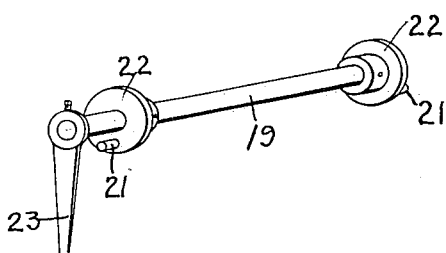

In the accompanying drawings: Figure 1— is a side elevation, partly broken away, of so much of a feeder employing the present improvement, as is necessary to illustrate the invention. Fig. 2— is a detail plan view of the pin cylinder and the means for adjusting it. Fig. 3— is a perspective view of the adjusting rod or shaft, and its operating handle.

Similar reference characters indicate the same or similar parts in all of the views.

A portion of the frame of the machine is indicated at 5, the machine employing the usual doffing cylinder 6, grid 7, and upper roller 8 for the pin apron 9. These, and the pin cylinder 10, may be constructed and operated in the ordinary or well known manner. The present improvements relate to the structure which I will now proceed to describe.

The shaft 11 of the cylinder 10 is mounted in bearings 12 having flanges 13, the frame 5 being formed with slots or openings 14 of a size to permit the bearings 12 to be shifted horizontally or toward and from the toothed carrier 9. The flanges 13 are formed with horizontal slots 15 through which project guide pins or bolts 16, the latter being mounted in the frame 5, and the structure being such that the bearings can be shifted on the ways provided by said bolts or pins 16.

Two arms or links 17 are provided, each having a hub 18 surrounding the cylinder shaft 11, so that, by shifting the arms or links 17 in the direction of their length, the pin cylinder can be adjusted relatively to the pin apron or toothed carrier 9. The means for simultaneously actuating the arms on links 17, so as to accurately shift and adjust both ends of the cylinder at the same time, comprise a rod or shaft 19 which is mounted in bearings 20 on the frame 5. Said rod or shaft 19 has two pins 21 which are equi-distant from the axis of said rod or shaft. Practically these pins 21 are crank pins. For convenience of mounting them, they are each carried by a disk or hub 22 which is firmly secured to the rod or shaft 19. Secured to one end of the rod 19 is an operating handle 23 whereby the said rod 19 and its pins 21 may be rocked or oscillated so as to simultaneously change the position of both ends of the pin cylinder relatively to the carrier or apron 9. Suitable means are provided for securing the rod 19 and its crank pins 20 or 21 in adjusted position. Said means may comprise set screws 24 tapped through the bearings 20 and bearing against the rod or shaft 19. As indicated in Fig. 1, however, a suitably notched arc-plate 27 may be secured to the frame 5 to coöperate with the handle 23 to hold the latter in adjusted position as by means of a pin or bolt passing through the handle into either one of a plurality of holes 28 in the arc-plate.

To facilitate the determining of the proper position for the pin cylinder, according to whether the staple operated upon is long, short, or intermediate, I may provide a pointer 25 connected to one of the arms or links 17, said pointer coöperating with a scale plate 26 attached to the frame of the machine. In practice it is usually not necessary to provide for adjustment to more than one of three position, and the plate therefore need have but three indications to coöperate with the pointer 25.

When the cotton is short staple, the handle 23 will be shifted toward the right from the position shown in Fig. 1 which represents the position as an intermediate one for intermediate length staple. When it is long staple cotton that is to be operated upon, the handle 23 will be shifted to the left. In any case, the parts are secured in the position to which they are adjusted, and then run while in that position for such length of time as the same quality of fibrous material continues to be used.

It will now be understood that the structure is such that there can be no uneven adjustment of the cylinder, because both ends thereof must be shifted to exactly the same extent, thus easily determining the desired distance or space between the pin-cylinder and the toothed carrier by means of the pointer and scale and securing the roll in that position.

I claim:

1. An improvement in machines for operating upon fibrous material comprising a toothed carrier, a pin cylinder, a shaft for said cylinder, bearing flanges in which said shaft is mounted, said flanges having slots therein, bolts secured to the frame of the machine and passing through said slots to guide said flanges, means engaging the ends of said shaft for moving both of said ends whereby said pin cylinder is adjusted relative to said toothed carrier to accommodate fibrous material of different lengths, said bearing flanges being free to move with said shaft when the latter is shifted, said shaft moving means also including means for locking the shaft in any adjusted position.

2. An improvement in machines for operating upon fibrous material comprising a toothed carrier, a pin cylinder, a shaft for said cylinder, bearing flanges in which said shaft is mounted, said frame and flanges being provided with complemental guiding means, a crank shaft, arms connected with said crank shaft and engaging the ends of the cylinder shaft, means for rocking said crank shaft, whereby both ends of said cylinder shaft are moved simultaneously to adjust the pin cylinder relative to the toothed carrier to accommodate fibrous material of different lengths, said bearing flanges being free to move with said shaft when the latter is shifted, and means for locking said crank shaft.

In testimony whereof I affix my signature in presence of two witnesses.

JAMES J. McGOWAN.

Witnesses:
HOWARD E. BARLOW,
E. I. OGDEN.

---

Copies of this patent may be obtained for five cents each, by addressing the "Commissioner of Patents, Washington, D. C."